United States Patent
White

(10) Patent No.: US 7,358,857 B1
(45) Date of Patent: Apr. 15, 2008

(54) GLOBAL POSITIONING SYSTEMS APPLICATIONS

(75) Inventor: Jay Paul White, Bohemia, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/338,744

(22) Filed: Jun. 23, 1999

Related U.S. Application Data

(63) Continuation of application No. 08/624,818, filed on Mar. 27, 1996, now abandoned.

(51) Int. Cl.
*G08B 13/14* (2006.01)

(52) U.S. Cl. .............................. 340/572.8; 340/539.13; 235/435

(58) Field of Classification Search ............... 740/988, 740/539, 825.49; 342/357.03; 701/213, 701/300; 473/407; 700/91, 90; 702/153, 702/159; 705/28; 235/385, 454, 492, 375, 235/383, 435; 340/572.8, 539.13
See application file for complete search history.

(56) References Cited

U.S. PATENT DOCUMENTS

| | | | |
|---|---|---|---|
| 3,721,985 A | 3/1973 | Perfitt | 342/388 |
| 4,387,297 A | 6/1983 | Swartz et al. | 235/462.21 |
| 4,409,470 A | 10/1983 | Shepard et al. | 235/462.35 |
| 4,477,809 A | 10/1984 | Bose | 340/10.41 |
| 4,639,914 A | 1/1987 | Winters | 370/334 |
| 4,672,658 A | 6/1987 | Kavehrad et al. | 455/555 |
| 4,739,328 A | 4/1988 | Koelle et al. | 342/44 |
| 4,740,792 A | 4/1988 | Sagey et al. | 342/457 |
| 4,760,248 A | 7/1988 | Swartz et al. | 235/462.21 |
| 4,786,907 A | 11/1988 | Koelle | 342/51 |
| 4,789,983 A | 12/1988 | Acampora et al. | 370/349 |
| 4,806,742 A | 2/1989 | Swartz et al. | 235/472.01 |
| 4,808,804 A | 2/1989 | Krichever et al. | 235/462.22 |
| 4,816,660 A | 3/1989 | Swartz et al. | 235/462.21 |
| 4,816,661 A | 3/1989 | Krichever et al. | 235/462.38 |
| 4,926,187 A | 5/1990 | Sugawara et al. | 342/361 |
| 4,928,096 A | 5/1990 | Leonardo et al. | 340/825.44 |

(Continued)

FOREIGN PATENT DOCUMENTS

EP 0583523 2/1994

(Continued)

OTHER PUBLICATIONS

Dixon, Robert C., Spread Spectrum Systems, Wiley & Sons, 1976.

*Primary Examiner*—Benjamin C. Lee
(74) *Attorney, Agent, or Firm*—Tarolli, Sundheim, Covell & Tummino LLP

(57) ABSTRACT

A global positioning system includes a fixed base unit of known position and at least one mobile unit, the base unit and the mobile unit each including a GPS receiver. This system further includes means for comparing the simultaneous GPS identified positions of the mobile unit and the base unit to establish the relative position of the mobile unit to the base unit. The mobile unit may be provided in a vehicle for allowing the instantaneous position of the vehicle to be identified relative to the base unit. Alternatively the mobile unit may include a bar code scanner for reading a bar code on an item and recording instantaneously the GPS identified position allowing a map of the position of various items relative to a base unit to be compiled.

17 Claims, 7 Drawing Sheets

U.S. PATENT DOCUMENTS

| | | | |
|---|---|---|---|
| 5,029,183 A | 7/1991 | Tymes | 375/141 |
| 5,030,807 A | 7/1991 | Landt et al. | 235/375 |
| 5,046,066 A | 9/1991 | Messenger | 370/349 |
| 5,055,659 A | 10/1991 | Hendrick et al. | 340/10.51 |
| 5,083,129 A | 1/1992 | Valentine et al. | 342/20 |
| 5,241,542 A | 8/1993 | Natarajan et al. | 370/311 |
| 5,260,694 A | 11/1993 | Remahl | 340/674 |
| 5,300,875 A | 4/1994 | Tuttle | 320/138 |
| 5,317,321 A | 5/1994 | Sass | 342/176 |
| 5,323,150 A | 6/1994 | Tuttle | 257/793 |
| 5,422,816 A | 6/1995 | Sprague et al. | 455/575 |
| 5,434,789 A * | 7/1995 | Fraker et al. | 473/407 |
| 5,440,559 A | 8/1995 | Gaskill | 370/314 |
| 5,450,329 A | 9/1995 | Tanner | 701/213 |
| 5,493,499 A | 2/1996 | Theurer et al. | 701/207 |
| 5,563,607 A * | 10/1996 | Loomis et al. | 342/357.03 |
| 5,751,246 A * | 5/1998 | Hertel | 342/357 |
| 5,873,070 A * | 2/1999 | Bunte et al. | 705/28 |

FOREIGN PATENT DOCUMENTS

FR    2693862    1/1994

\* cited by examiner

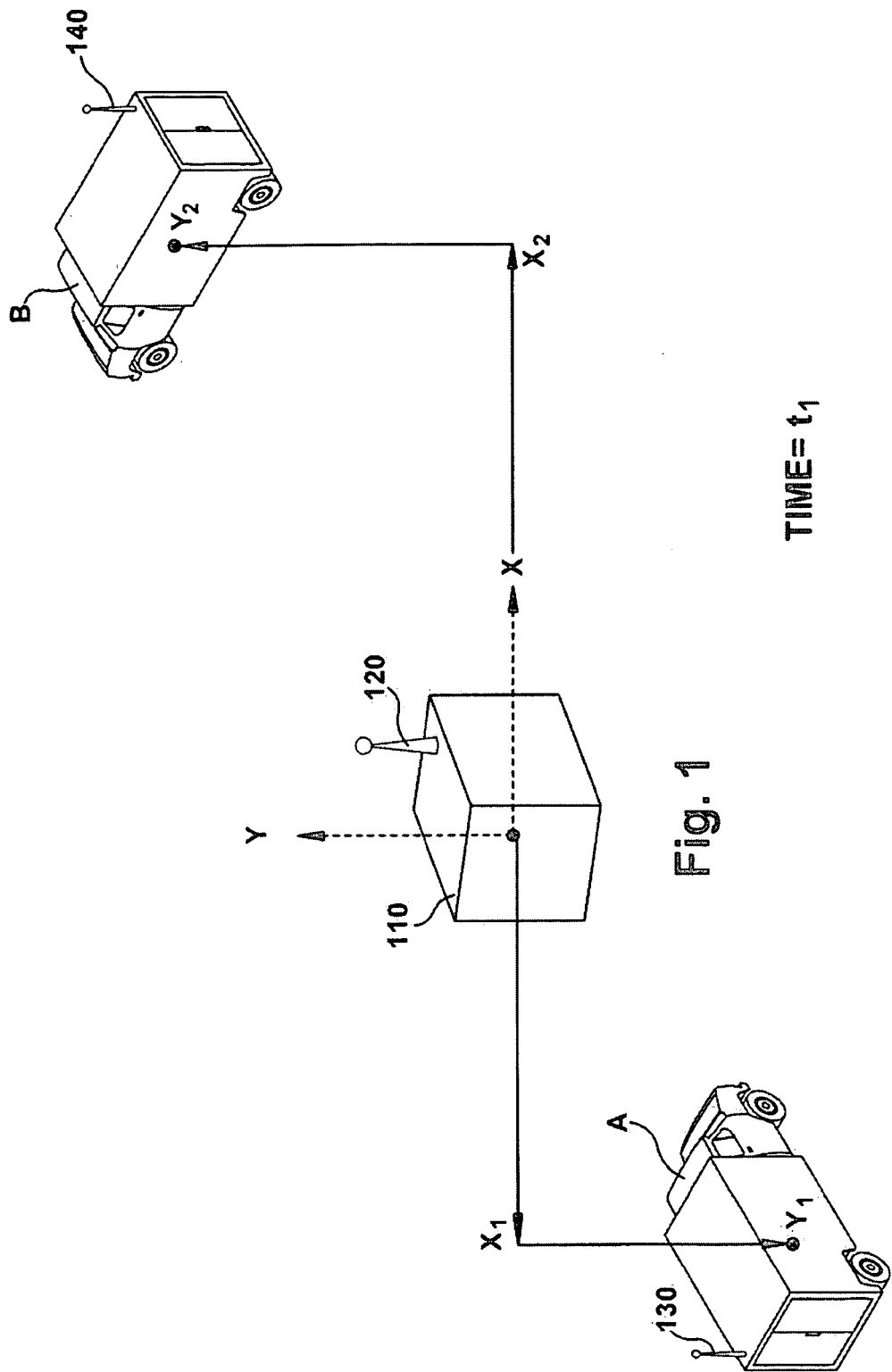

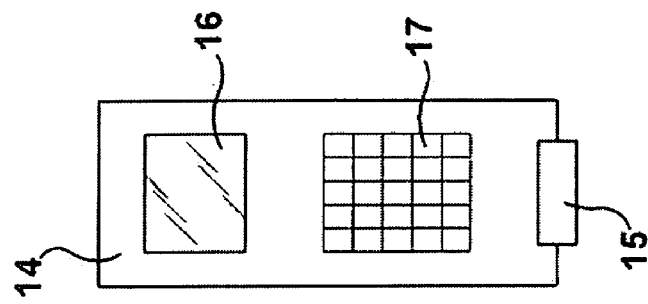
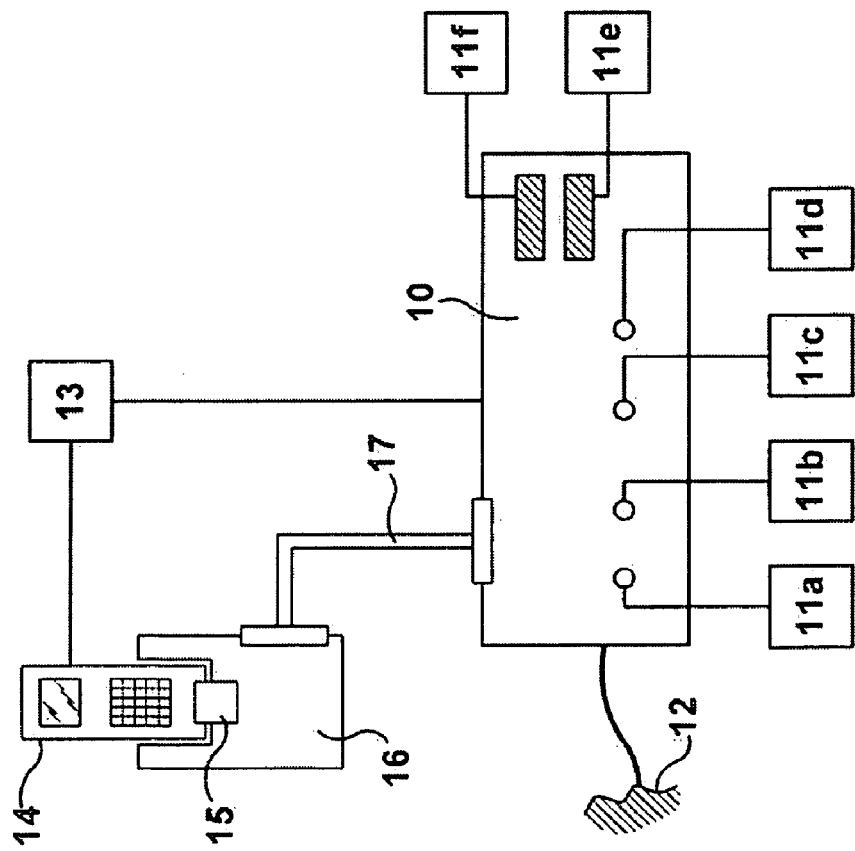
Fig. 2b
Fig. 2a

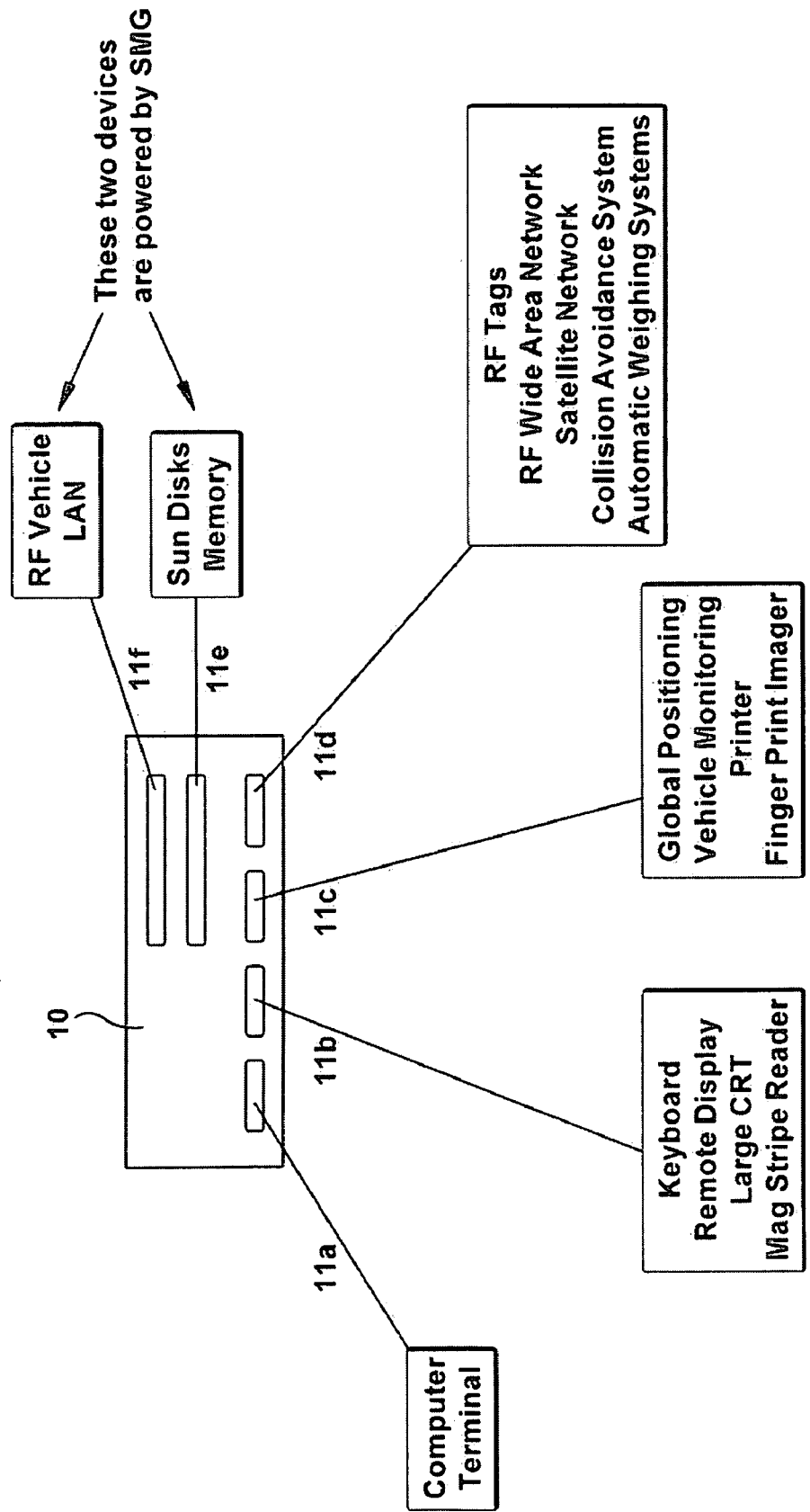

GLOBAL POSITIONING SYSTEMS APPLICATIONS

CROSS REFERENCE TO RELATED APPLICATION

This application is a continuation of U.S. application Ser. No. 08/624,818, filed Mar. 27, 1996 now abandoned.

BACKGROUND OF INVENTION

Field of the Invention

The invention relates to inventorying goods and vehicle tracking application using the global positioning system (GPS).

The global positioning system comprises twenty four navigational satellites in high orbit about 20,000 km about the earth. The satellites transmit precise time and position information continuously and the transmissions can be received anywhere in the world by a suitable GPS receiver. By processing the information the transmission of the GPS receiver can determine its exact position fix via ranging. Each satellite transmits almanac and ephemeris data components. The almanac data components contain information on the location and operational status of satellites in the system. The ephemeris data components comprise the precise satellite positioning information that is used for ranging. At present the global positioning system is used for navigation between locations identified by an address given by their longitude and latitude. In other words the GPS system conventionally operates using address positioning whereby, in effect, to navigate from a first point to a second point the absolute addresses of each point must be specified. Whilst address oriented positioning is often suitable for machine to machine communications it is less preferable in person to person or machine to person communication as it requires the person involved to know his or her absolute position.

An example of machine to person/person to machine communication is that used in recording the storage of articles in a warehouse ("pick and place"). Typical warehouse pick and place applications currently utilise bar code technology wherein the item to be taken from or stored on a fixed shelf or bin location carries its own unique bar code symbol, and the shelf/bin location is also identified by a unique address encoded in a bar code symbol fixed to the shelf/bin. During the storage or placing phase, the bar code symbol affixed to the item such as a parcel to be stored is scanned, and the bar code symbol on the shelf/bin is also scanned by a suitable bar code reader. The information decoded from each of the scans is stored at a central data base such that the item identity is associated with the shelf/bin location in the database. Similarly when the item is picked or removed from the shelf/bin, the bar code symbols on the item to be removed and the shelf/bin are scanned to confirm that the item being picked has been taken from the correct inventory location. Accordingly an inventorying or recordal system is achieved whereby the location of any item is stored at the central database. In addition, when the item is removed the corresponding code is disassociated from its former inventory location at the central database.

Whilst these pick and place transactions comprise a considerable simplification and streamlining of prior inventorying systems, two scanning events are still required together with the corresponding data processing, and the uniquely labelled and ordered shelf/bin structure for the warehouse is required. Accordingly the known systems are not entirely suitable for environments that are constantly changing or difficult to map into neatly ordered and labelled shelf/bin locations such as ship yards, freight train yards and the like.

U.S. Pat. No. 5,422,816 assigned to Trimble Navigation Limited and which is incorporated herein by reference relates to a GPS transceiver provided in a mobile unit forming part of a network in which the mobile unit communicates to other mobile units within the network absolute positions and velocities derived from the GPS data for use in distance-to-goal, estimated-time-of arrival and velocity-made-good estimates. The system described in that specification includes a data/voice modem.

In known arrangements incorporating GPS in vehicles for deriving data such as that discussed in the above-mentioned U.S. Pat. No. 5,422,816, various problems arise in particular, the known systems are capable of using only one architecture and have additional power bus requirements and restricted user interface coactivity options.

SUMMARY OF THE INVENTION

Objects of the Invention

It is an object of the present invention to provide an arrangement comprising further improvements over the prior art.

It is a further object to provide a GPS system suitable for person to machine/machine to person communications.

It is a further object to provide an improved inventorying system.

It is still a further object to provide an improved vehicle position identifying system using GPS.

Features of the Present Invention

According to the invention there is provided a positioning system comprising a fixed base unit, at least one mobile unit and a data recorder, wherein the base unit and the or each mobile unit include a GPS receiver and wherein the or each mobile unit is arranged to record its position indicated by its GPS receiver and the data recorder is arranged to compare the recorded position of the mobile unit with the position recorded simultaneously by the fixed base unit from its GPS receiver to establish the position of the mobile unit relative to the base unit. Because the system indicates relative positions it is particularly suitable for person to person and person to machine communications.

The system may comprise a vehicle position identifying system wherein the mobile unit is provided in a vehicle and is arranged to transmit its instantaneous GPS identified position to the data recorder together with identification information identifying the vehicle or mobile unit. Accordingly the location of the vehicle may be determined at any time. The mobile unit may include a processor connectable to a GPS receiver and a vehicle transmitter. The processor may further be connectable to one or more of a computer terminal, a keyboard, a remote display, a CRT, a magnetic stripe reader, a vehicle monitoring system, a printer, a finger print imager, a radio frequency identification tag, a radio frequency wide area network, a satellite network, a collision avoidance system, a automatic weighing system or a remote memory store. The system may further comprise a portable terminal, the portable terminal being connectable to the processor and including a bar code reader for inputting identification information to the processor. The processor may be connectable to one or more information input or output devices all of which are serial connected and arranged to receive power from the vehicle.

The system may comprise a stored item position identifying system wherein the or each mobile unit is arranged to record identification information for identifying an item simultaneously with its GPS identified position. Accordingly it is not necessary to scan information as to the items location allowing streamlining of the system. In addition, "soft" warehousing is attainable.

The or each mobile unit may comprise a bar code reader for reading a bar code symbol on an item to record identification information. The or each mobile unit may communicate with a base station by radio communication. The mobile units and the base station may comprise a local area network communicating by wireless communication. The or each mobile unit may include a data memory for storing a GPS identified position, item identification and time of reading information, and be arranged to download the information to the data recorder at a later stage.

The system may further comprise a display unit for displaying the position of the or each mobile unit relative to the base unit.

According to the invention there is further provided a method of identifying the location of one or more mobile units relative to a fixed base unit wherein the or each mobile unit and the base unit are each equipped with a GPS receiver and wherein the mobile unit and base unit simultaneously record their GPS identified position and a data recorder records the position of the or each mobile unit relative to the base unit.

The mobile unit may transmit its GPS identified position information instantaneously. The mobile unit may store its GPS position information together with the exact time at which the information is derived and subsequently downloads that data. The or each mobile unit may include a bar code reader, and the mobile unit may record its GPS identified position simultaneously with the reading of a bar code symbol on an item for identification of the position of the item relative to the base unit.

According to the invention there is further provided a vehicle position identifying system comprising a fixed base unit and at least one mobile unit mounted in a vehicle, the base unit and the mobile unit including GPS receivers and the system further comprising a data recorder wherein the data recorder is arranged to compare the simultaneous GPS identified positions of the mobile unit and the base unit to determine the position of the mobile unit relative to the base unit.

According to the invention there is yet further provided an item position identification system comprising a base unit and at least one mobile unit the base unit and the mobile unit including GPS receivers, the mobile unit including an input arrangement for inputting identification information relating to an item and being arranged to record its GPS identified position simultaneously, the system further comprising a data recorder arranged to compare the simultaneous GPS identified positions of the mobile unit and the base unit to establish the position of the mobile unit relative to the base unit and further being arranged to associate the identification information with the relative position.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several views, and in which:

FIG. 1 shows diagrammatically a GPS based vehicle position identifying system according to the present invention;

FIG. 2a shows on-board equipment for the system of FIG. 1;

FIG. 2b shows a detail of FIG. 2a;

FIG. 3 shows connectivity option for a vehicle GPS system;

Figure 4:
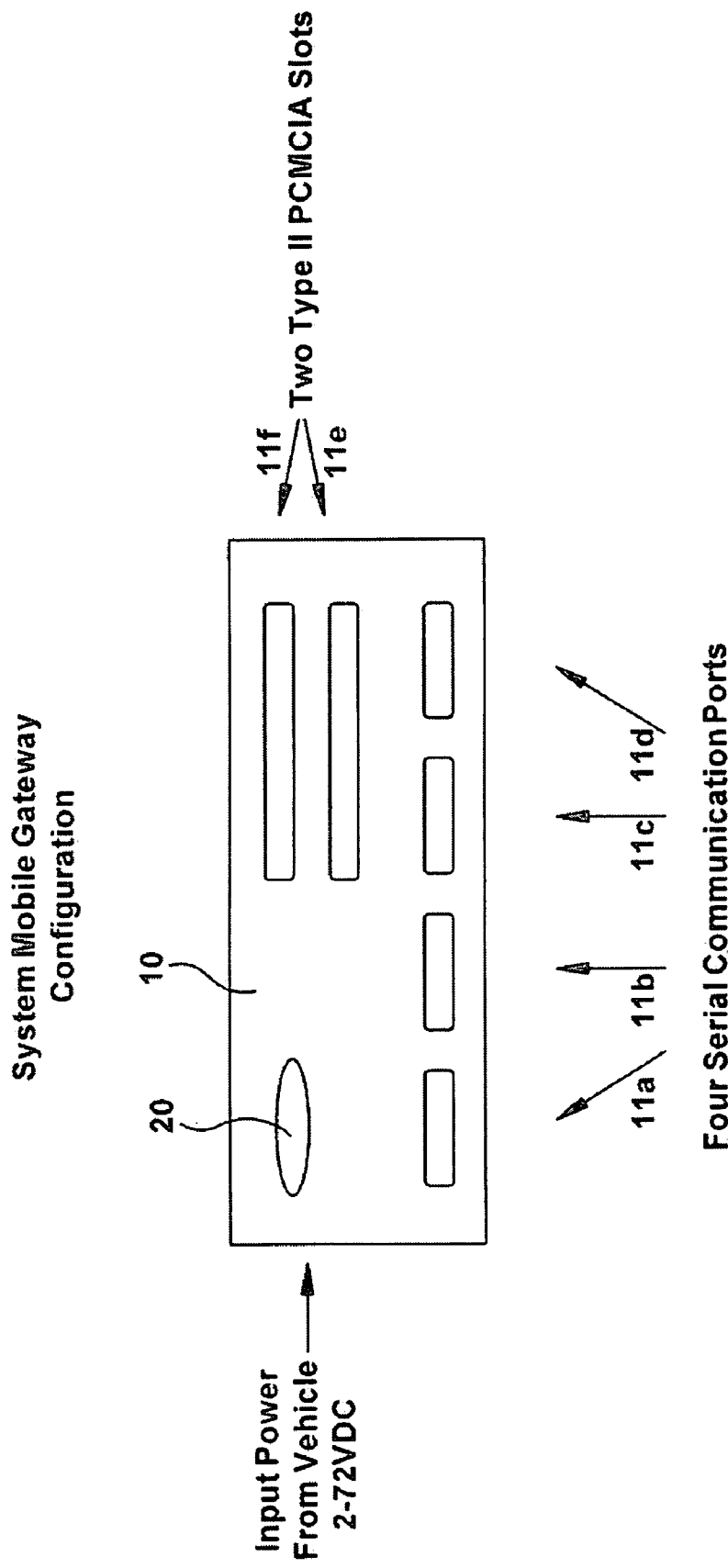
FIG. 4 shows a detail of FIG. 3.

The differential global positioning system (DGPS) has been introduced to overcome the effects of the selectively availability (SA) operation inherent in the GPS system. The accuracy of GPS receivers is limited by a random error that has been introduced into the coded ephemeris data to reduce the accuracy of a receiver under the SA operation. The magnitude of the error changes frequently but can be up to 100 m or so. DGPS has been developed on the basis that a GPS receiver at a known fixed longitude and latitude position can instantaneously determine the SA random error by comparing the satellite ephemeris data with its known location. Since the SA random error is common to all GPS receivers and received simultaneously with the ephemeris data, GPS receivers communicating with the GPS receiver at the known position can determine their precise position by subtracting the SA information determined by the receiver at the fixed location. The DGPS system has been proposed for land survey systems and airport landing systems.

As mentioned above, conventional GPS systems are based on an address oriented approach whereby in order to navigate the navigator requires its current position address and its desired destination position address. The address positioning approach is particularly suitable for machine to machine communications as each machine can easily automatically establish its absolute address. An alternative system is that of relative positioning which automatically takes into account the navigator's current position and informs the navigator what direction it must go to arrive at the destination. As a concrete example, when navigating using address positioning, the destination address could be given simply as, for example, an X,Y coordinate. On the other hand navigating using relative positioning the navigator would be given a position-length vector. Accordingly it will be seen that in the latter case the navigator would not need to know its current position and would require no more information than the position-length vector. The relative positioning approach is of particular advantage in person to person communications and machine to person/person to machine communications in which the approach would be highly user friendly.

It is now proposed to make use of the DGPS system discussed above to achieve relative positioning. Typically the goal of navigation systems has been to determine a precise positional fix with respect to known datums or maps based on a known datum. DGPS allows the possibility of networking multiple receivers to share ephemeris data, nullify the effects of SA, and achieve this goal with high precision.

For example in a wireless local area network (LAN), in order to determine the relative distances between transceivers and a defined base station, then the base station, equipped with a GPS receiver, is established as reference point zero. Accordingly a map of the LAN physical area can be developed by considering the ephemeris data in its entirety as the error. It will be seen that the SA random error will be nullified by this approach. The base station would broadcast the error to all mobile units in the LAN, all of which would also contain GPS receivers. Thus the mobile units will calculate and report back their relative position with respect to the base station at reference point zero, forming a basis for relative positioning.

As an example of such a system, it will often be desired to obtain more data in a package delivery operation, for example by identifying the location of a truck containing a desired package at any time. It will be seen that this can be achieved using the modified GPS approach discussed above and as shown in FIG. 1. A base station 110 includes a GPS receiver 120 and tracks the position of two trucks A and B carrying GPS receivers 130 and 140 respectively. By assessing the ephemeris data received at the base station 110 and the trucks A and B at a time $T_1$, the respective positional vectors at time $T_1$, $(x_1, y_1, [T_1])$, $(x_2, y_2, [T_1])$ can be derived. Information as to which package was in which vehicle could be entered at an earlier stage onto a central database accessed by the base station 110, for example by reading a bar code symbol provided on the package and associating that with the given truck on the central database. Accordingly information as to the location of the package could be established at any time, and by taking successive readings in time, estimates of the time of arrival of the package and so forth could be simply derived.

The hardware involved in the system is well known in the art and attention is directed once again to the above mentioned U.S. Pat. No. 5,422,816 of Trimble Navigation Limited. An example of a type of sub-assembly which could be used to provide GPS capability in a terminal is the six channel GPS receiver module manufactured by Trimble Navigation under the trade mark SVeeSix-104.

A block diagram showing the configuration in an on-board vehicle application is shown in FIGS. 2a and 2b. A central PC 10 is maintained in a vehicle, for example interfacing with other components in the vehicle electronic system or alternatively operating in a stand-alone configuration. The PC 10 is configured in a simple plug-in type design and is arranged to interface with various modules 11a to 11f. Module 11a can be a GPS receiver for inputting location information to the PC. Module 11b can be a radio frequency wireless local area network or wide area network transceiver in communication with the base station 1. Module 11c can be a display output such as a CRT screen. Module 11d can be a further display such as a hard copy printer. Module 11e can be a further user interface such as a keyboard and module 11f can be a radio frequency vehicle local area network transceiver.

The PC 10 can be wired to the vehicle power or communications or electronics system via a line 12 or may alternatively be powered by a source 13. Also incorporated into the system optionally is a portable terminal 14 shown in detail in FIG. 2b. The terminal may include a bar code reading system (not shown) for reading the codes of packages loaded onto the truck and interface means 15 which may be either physical interface means or wireless interface means such as radio frequency interface means for communicating information to the PC in order that the location of the package on the truck can be stored at the central data base, communicated thereto by the vehicle RFLAN. The terminal further includes a display screen 16 and a key pad 17 allowing the user to enter to access further information or alter the mode of operation of the reader as appropriate. The reader terminal 14 is shown in FIG. 2a in its recharging position connected to a power supply 13. While recharging the reader terminal 14 may also download any information stored in a memory provided therein by interface 15 to the PC 10.

The interface between the PC 10 and a recharger 16 for the reader terminal 14 can be, for example, an RS 232 interface 17. It will be appreciated that various other modules can be added or substituted in connection with the PC 10, for example connection can be made to a vehicle on-board trip computer.

Details of the system are shown in more detail in FIGS. 3 and 4. Referring to FIG. 3 a PC 10 is shown and various connectivity options are displayed. All the serial connector devices shown receive power from the vehicle. Port 11a is connectable to a computer terminal; because of the open architecture of the system a designated terminal can be provided or any other terminal. Port 11b is connectable to, for example, a keyboard with a remote display or enlarged CRT or a magnetic stripe reader or any combination of those. Port 11c is connectable to the global positioning system, or the vehicle monitoring system or a printer or a finger print imager or any combination of those. Port 11d is connectable to a radio frequency tag, a radio frequency wide area network, a satellite network, a collision avoidance system, an automatic weighing system or any combination of those. Port 11e is connectable to a memory store such as discs and port 11f is connectable to the radio frequency vehicle LAN. The devices connected to ports 11e and 11f are internally powered by the system.

FIG. 4 provides more information as to the exact nature of the various interconnecting interfaces on the PC 10. An input power connector is shown at 20 connectable to a vehicle 2-72 VDC. Ports 11a to 11d are serial communication ports and ports 11e and 11f are type II PCMCIA slots.

The arrangement provides an open architecture "mobile gateway" allowing a variety of connectivity options via standard serial connections, rather than LAN architecture requiring proprietary or dedicated components as in the prior art. Power is supplied to the sub-systems directly from the vehicle rather than via a unique power bus structure. The architecture is specifically designed for transportation implementations, for example placing a in a vehicle or truck. The invention incorporates the Plato cradle design available from the assignee incorporating IRDA communication interface from the Plato to the Communications Cradle. Whereas prior art arrangements have been designed around a terminal based architecture the network architecture of the present invention is designed around an industry standard PC based platform where the terminal is only one of the connectivity options on the truck, as can best be seen from FIG. 3. The arrangement accordingly allows mobile client server capability. The integration of the PC terminal client and server (mobile gateway) communicating through an RF LAN is a unique approach in the transportation field.

Further applications of the system according to the present invention will now be discussed. As discussed above a GPS receiver whose exact position (longitude and latitude) is known and fixed can instantaneously determine the selective availability random error by comparing the data received from the GPS satellites (ephemeris data) with its known location. As the SA error is received simultaneously by all GPS receivers, all other GPS receivers can determine their precise position by correcting for the error detected by the GPS receiver at the known position, that is by subtracting the SA information determined by that receiver. Such a system has been proposed under the term differential global positioning system (DGPS) for land survey systems and airport landing systems. DGPS allows the synchronisation of multiple receivers to share ephemeris data accurately, nullify the effects of the SA error and achieve the goal of precise positional fixing with high precision.

This technique can be extended to a wireless local area network (LAN) to determine the relative distances between transceivers and a base station. If the base station equipped with a GPS receiver is designated as reference point zero, a map of the LAN coverage area including the positions of all other transceivers in the area can be developed simply by considering the ephemeris data in its entirety as the error. In other words, by establishing the location of a mobile transceiver relative to a base station, the SA error will automatically be cancelled out and the information retained would be an indication of the position of the mobile transceiver relative to the base station. The base station would broadcast the SA error to all mobile units in the LAN. The mobile units which also contain GPS receivers, would calculate and report back their relative position with respect to the base station at reference point zero.

The system would therefore allow relative positioning which as discussed above, is particularly useful in machine to person and person to person applications.

Figure 5:
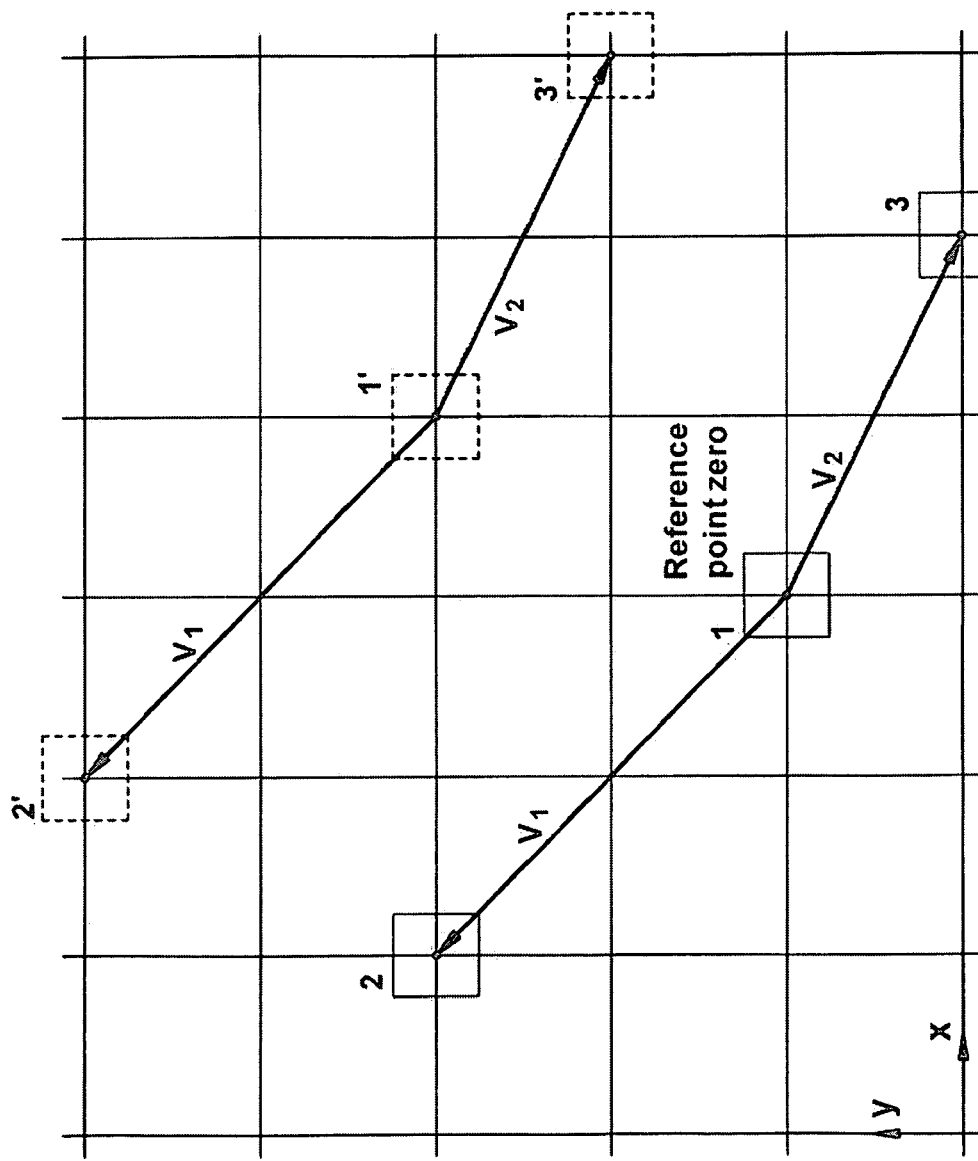
FIG. 5 demonstrates the elative positioning concept of the present invention.

The system can be best understood with reference to FIG. 5. There is provided a base station 1 and mobile units 2 and 3, each equipped with a GPS transceiver. The recorded position of each of the base station 1 and the mobile units 2 and 3 is altered by the SA error which, in the very simplified system shown in FIG. 5 increases the x coordinate by one unit and the y coordinate by two units. Because the SA error is common to all of the fixed units 1, 2 and 3 their recorded positions at 1', 2' and 3' are each translated similarly. If positional vectors $V_1, V_2$ are established indicating the relative positions between the mobile unit 2 and base station 1, a mobile unit 3 and base station 1 respectively, it will be appreciated that those vectors will be identical whether drawn between the true positions of each of the units or the perceived positions of each of the units. In other words the system allows a simple and straightforward determination of the relative positions of each mobile unit 2, 3 with respect to the base station 1 irrespective of the SA error. Mathematically the situation can be expressed as follows:

1: $\begin{cases} SA(x_1) = SA(x_2) \\ SA(y_1) = SA(y_2) \end{cases}$

2: $\begin{cases} P(1) = (x_1, y_1) \\ P(1') = (x_1 + SA(x_1), y_1 + SA(y_1)) \end{cases}$ 3: $\begin{cases} P(2) = (x_2, y_2) \\ P(2') = (x_2 + SA(x_2), y_2 + SA(x_2)) \end{cases}$ 4: $V_1 = P(1) \rightarrow P(2) = \begin{pmatrix} x_2 - x_1 \\ y_2 - y_1 \end{pmatrix}$ 5: $P(1') \rightarrow P(2') = \begin{pmatrix} [x_2 + SA(x_2)] - [x_1 + SA(x_1)] \\ [y_2 + SA(y_2)] - [y_1 + SA(y_1)] \end{pmatrix} = \begin{pmatrix} x_2 - x_1 \\ y_2 - y_1 \end{pmatrix}$ 6: $P(1) \rightarrow P(2) = P(1') \rightarrow P(2')$ In the above equations the SA error associated with a given position is expressed as SA(x/y), the position of a unit n is expressed by P(n) and the vector expressing the relative position of a mobile unit relative to a base station is expressed as $P(\vec{1}) P(2)$. As can be seen, because the SA errors are equal the vector indicating the relative location of any mobile unit relative to the base station can be determined regardless of the SA error. Accordingly a map of the LAN area indicating the instantaneous position of all mobile units in the area can be established treating the base station as reference point zero.

One application of this system is in a warehouse pick-and-place system employing the traditional fixed shelf/bin locations, and the application can be extended to temporary or soft storage areas which can be treated as though they were fixed shelving/bin locations. The system shown in FIG. 5 is effectively a relative positioning system which as discussed above is of particular benefit for conveying local area routing directions. Because it simply provides a directional vector to a new location from the current location the navigator is not required to fix a current location prior to navigating.

In current warehouse pick-and-place applications the user, when recording the position of an item, must scan the bar code symbol on the item itself and also the bar code symbol on the shelf/bin where the item is to be kept in order that the two records can be associated in the central data base allowing the position of the item to be recorded. Similarly when the item is removed from the shelf the bar code symbol on the item and the bar code symbol on the shelf/bin are scanned and the item is then disassociated with its former inventory location.

The present invention allows an improvement over the prior art systems using relative positioning and DGPS techniques such that the same pick/place transaction is accomplished by a single scanning action of a single bar code symbol, reducing the amount of time spent in inventorying. As will be understood from the following discussion, the invention does not require a uniquely labelled and ordered warehouse as in the prior art systems.

Figure 6:
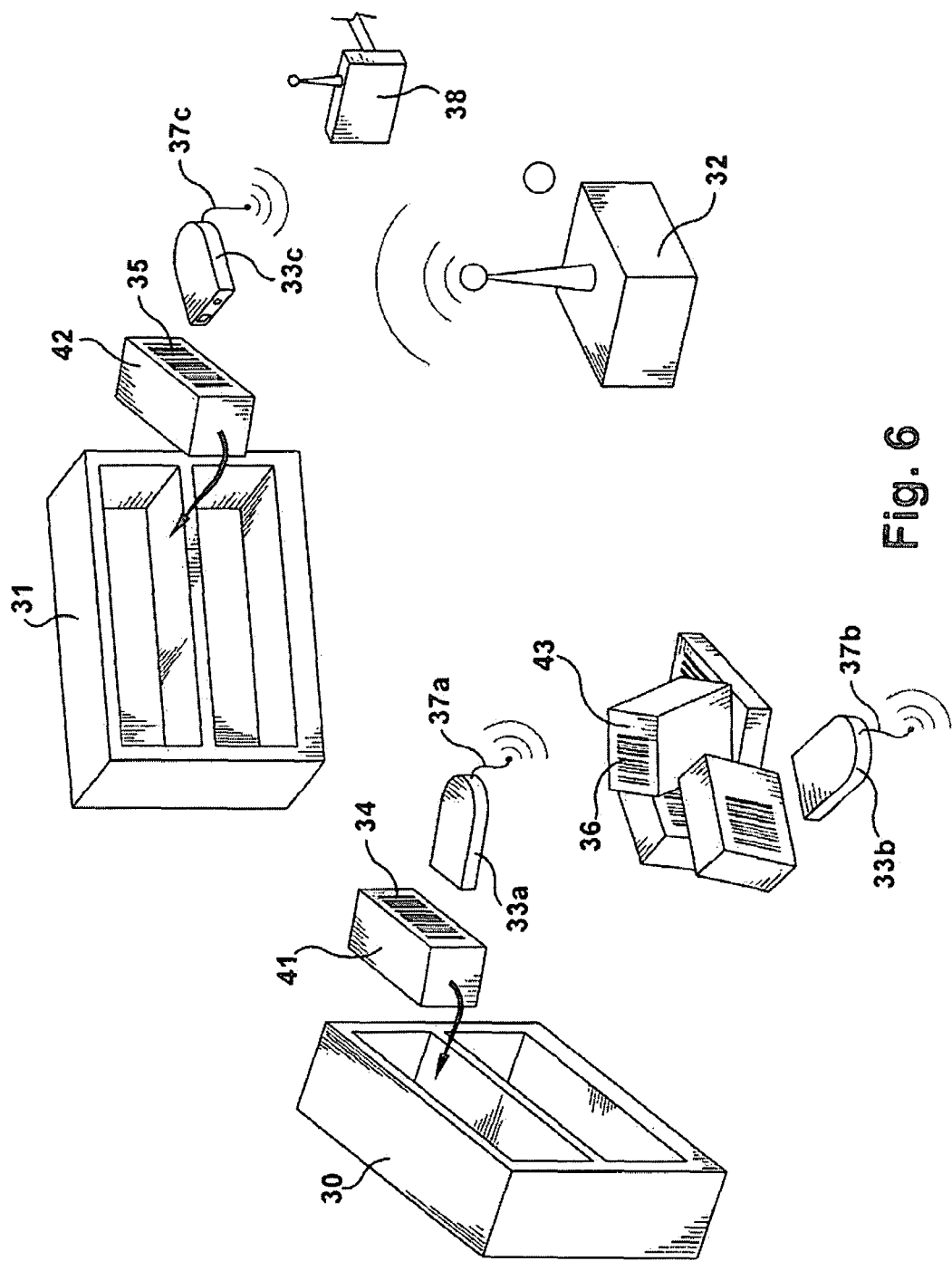
FIG. 6 shows a warehouse inventorying system according to the present invention.

Referring to FIG. 6 a warehouse is shown schematically including fixed storage locations 30, 31. The system according to the invention includes a fixed base station 32 at reference point zero and one or more bar code scanners 33a,33b,33c which are portable, allowing the user to roam about the warehouse space. The base station 32 and each of the bar code scanners 33a,b,c are equipped with GPS transceivers. Shown schematically in the figure are items, in fact parcels 41,42,43 which are to be stored at different locations in the warehouse.

For example it may be desired to store parcel 41 at storage location 30 in which case it will be desirable to form a database entry indicating that item 41 is found at the storage location 30. Accordingly the user stores the item 41 at location 30 and then scans the bar code symbol 34 on the item 41 with the bar code scanner 33a. At the same time the bar code scanner establishes its position data using the internal GPS arrangement. Accordingly the bar code scanner records simultaneously details of the item—for example an identification code—by scanning bar code symbol 34 and obtains a positional fix as to where the reading was taken by the GPS arrangement. That information is then stored in a central data base which associates the item with its position. It will be seen therefore that only a single scan, to identify the article 41 is required; no scan is required to identify the location, for example by scanning a bar code symbol at the location as the location information is provided by the GPS arrangement within the scanner 33a.

In a similar manner, the identity and position of item 42 can be established by a single scan of the bar code symbol 35 on the item 42 by the bar code scanner 33c, which obtains a positional fix using its internal GPS arrangement. It will be seen that the system will work with various storage systems; for example a further item 43 is found in a pile located randomly in the warehouse, yet by scanning the bar code symbol 30 on the item 43 by scanner 33b the position and identity of the item 43 can be recorded in the data base relying on the GPS arrangement in the scanner 33b.

It will be appreciated that although three scanners, 33a to 33c are shown, only one scanner is strictly required; the user may roam around the warehouse scanning items and relying on the scanner to simultaneously establish a positional fix. The scanners are shown with respective antennae 37a to 37c which can transmit the information directly to the base station 32 or to an additional access point to a data base 38. In the latter case the base station will transmit its positional information recorded simultaneously to the access point of the data base 38. The fixed base station communicates with roving portable devices by means of radio stations.

Alternatively the scanners 33a to 33c can comprise roving batch terminals equipped with GPS receivers in which case they need only record transactions, the locations of those transactions and the exact time those transactions were made at the time of scanning. The information can be subsequently downloaded to a data base and corrected by time referencing it to the ephemeris data recorded at the base station. Such an application would be used in areas where no radio transmissions are permitted, or setting up a LAN would be prohibitive.

Whichever approach is taken, the only information required by the data base is the identity of the item, the position of the scanner at the time the item was scanned and the position of the base station at the same moment. In that way the relative position of the item with regard to the base station can be established regardless of the SA error introduced as discussed in more detail above with reference to FIG. 5.

Figure 8B:
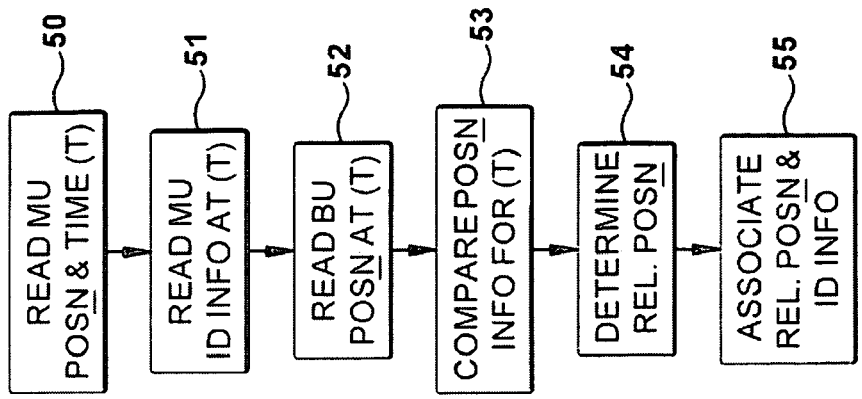
FIG. 8b is a flow chart showing the steps taken by a data processor in an alternative arrangement.
Figure 8A:
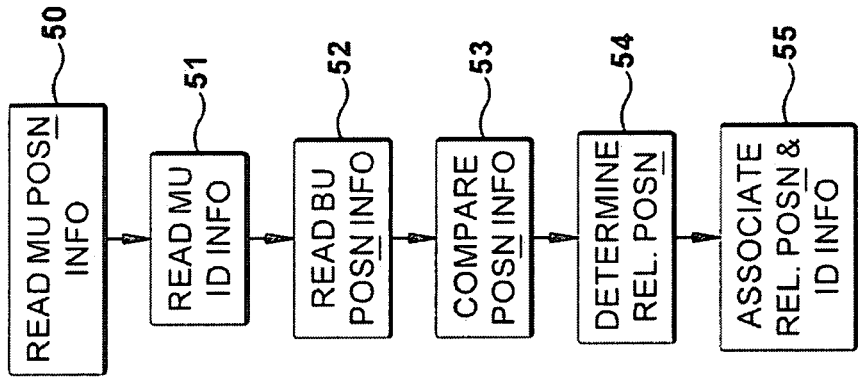
FIG. 8a is a flow chart showing the steps taken by a data processor in the course of the invention.

FIG. 8a is a block diagram showing the steps taken by a processor such as a data recorder for identifying the position of a given item. At step 50 the GPS identified position of a mobile unit (MU) is read. At 51 the item identification information scanned by the mobile unit is read. At 52 the GPS identified base station or base unit (BU) information is read. At 53 the position information is compared. At 54 the position of the mobile unit relative to the base unit is determined and at 55 the relative position and the identification information are associated in the data base allowing the location of the item relative to the base unit to be immediately accessed from the data base.

Referring to FIG. 8b the operation when the mobile unit is a batch terminal and stores information for later downloading is shown. The steps are identical except that the mobile unit position is read together with information as to the time (T) when it was at that position (50). At 51 the identification information at the time (T) is read. At 52 the base unit position at time (T) is read. Steps fifty three to fifty five are then carried out and, assuming the item has not been moved since time (T), its position and identification are associated and stored in the data base for retrieval by a user or clerk.

With this system it is possible to calculate and determine the location of any scanning transaction within the coverage area of the LAN without any other marking system. Accordingly any space, open or closed, neatly ordered piles or disorganised heaps can be considered a warehouse where the materials can be catalogued and tracked in a database.

Figure 7:
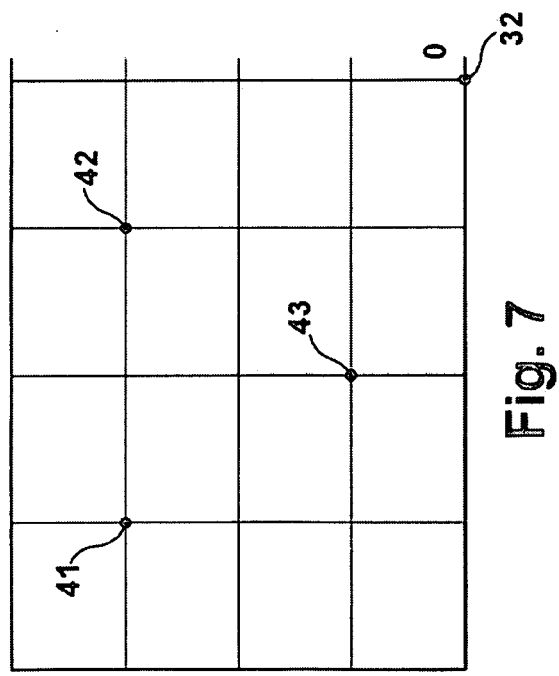
FIG. 7 is an example of a display corresponding to the system of FIG. 6.

In order for the user to then locate any item he need only enter the relevant information, such as an identification code, into the data base and a position location will be displayed. Preferably a graphical display, for example on a VDU, is provided such as the one shown in FIG. 7. On this display the base station is shown and a marker showing the position of the item 41,42 or 43 relative to the base station 32 is indicated either by a simple marker or, where the position of more than one item is desired to be established, by the identification code or other identification at the relevant place. The graphics display may include a drawing of, or be superimposed upon a map of the warehouse. The display can be provided on the scanner itself in which case the map can be generated using the current position of the terminal of the scanner as the starting point and give directions to guide a user or clerk through the warehouse to the appropriate destination using relative positioning. One manner of forming the map in the first place is to locate "land marks" within the warehouse, and scan their position into the system together with suitable identifying information. The land marks will then appear with their respective identification at various locations on the graphics display rendering the navigation of the user yet easier.

It will be appreciated that the system may be used in many other applications. For example the inventory of goods on display racks in a retail store can be taken by establishing a GPS receiver at a known fixed location to record ephemeris data fluctuations with respect to time, the contents of the store can be scanned with as many batch terminals equipped with GPS receivers as required and the inventory data may be processed by downloading to a data base as discussed above so as to build a map of the location of all goods in the score. The technology can also be easily introduced into environments that are constantly changing or difficult to map into neatly ordered and labelled shelf/bin locations. Ship yards and freight train yards are examples of environments that could be difficult to expensive to label with bar coded location ID tags.

Without further analysis, the foregoing will so fully reveal the gist of the present invention that others can readily adapt it to various applications without omitting features that, from the standpoint of prior art, fairly constitute essential characteristics of the generic or specific aspects of the invention and, therefore, such adaptions should and are intended to be compounded within the meaning and range of equivalents of the following claims.

The invention claimed is:

1. A method for storing items in a storage facility, wherein the storage facility is a warehouse or other facility in which the items are stored in defined storage locations including shelves or bins, the method comprising:
   receiving and recording a GPS signal through a transceiver within an indicia scanner at first location;
   determining an approximate coordinate position of the first location based on the GPS signal received by the transceiver coupled to an indicia scanner;
   processing the GPS signal to determine the approximate coordinate position of the first location;
   determining the identity of an item by scanning a symbol associated with the item with said indicia scanner;
   reading a broadcast error compensation signal transmitted directly from a base station having a fixed location;
   comparing the approximate coordinate position of the first location from the GPS signal to the broadcast error compensation signal from the base station;

determining a second location based on said comparing, the second location being a storage location at which an item is to be stored; and associating the storage location and identity in a database.

2. The method of claim 1 wherein the storage facility is a retail store in which the items are stored on display racks or shelves.

3. The method of claim 1 wherein the symbol associated with the item is a bar code symbol and said indicia scanner is a bar code scanner.

4. The method of claim 3 wherein the bar code symbol is scanned using the bar code scanner when the item is removed from storage.

5. The method of claim 1 further comprising providing location error information in the broadcast error compensation signal transmitted from the base station, the location error information produced as a result of a GPS signal received by the base station providing a calculated location of the base station different than the base station's fixed location; and receiving the location error information in the broadcast error compensation signal for removing location error data in the indicia scanner provided by the GPS signal to the transceiver.

6. The method of claim 5 wherein location error data is removed in real time by establishing communication between the transceiver and the base station.

7. The method of claim 5 wherein the location error data is removed at a later time by recording the time at which the transceiver recorded the GPS signal; simultaneously recording another GPS signal at the base station of a known location; and using correction factors derived from the GPS signal recorded at the base station to remove the location error data for the transceiver at corresponding times.

8. The method of claim 1 wherein the recording of the GPS signal by the transceiver and the scanning of the symbol are performed by the same indicia scanner.

9. The method of claim 1 wherein the symbol associated with the item is a bar code symbol; and said indicia scanner is a portable bar code scanner.

10. The method of claim 1 further comprising reading a GPS signal at said base station and broadcasting simultaneously said error compensation signal as a result of the GPS signal to the base station to remove location error data in at least one indicia scanner.

11. The method of claim 10, wherein location error data is removed in real time by establishing communication between the transceiver and the base station.

12. The method of claim 10 wherein the location error data is removed at a later time by recording the time at which the transceiver recorded the GPS signal, simultaneously recording another GPS signal at the base station of a known location and using correction factors derived from the GPS signal recorded at the base station to remove the location error data for the transceiver at corresponding times.

13. A portable device for recording the identity and location of items stored in a storage facility, wherein the storage facility is a warehouse or other facility in which the items are stored in defined storage locations including shelves or bins, the device comprising:

a GPS receiver within a bar code scanner for receiving a signal at a storage location in which an item is scanned, the GPS signal providing a first positional fix of said storage location;

a recorder located in said bar code scanner capable of recording the details of the item scanned by scanning a symbol associated with the item and simultaneously recording the first positional fix of said storage location;

the GPS receiver further capable of receiving a broadcast error correction signal transmitted from a base station for adjusting said first positional fix to form a second positional fix relatively closer to said storage location than said first positional fix; and a transmitter coupled to said bar code scanner capable of transmitting said second positional fix of said storage location and recorded details of the item to a remotely located database wherein said second positional fix and said recorded details of the item are associated.

14. The portable device of claim 13 wherein the GPS receiver and bar code scanner are integral parts of the device.

15. The portable device of claim 13 further comprising a wireless communication transceiver for handling data communication between the portable device and the base station.

16. A method of storing items in a storage facility comprising:

scanning an indicium associated with an item to be stored within the storage facility at a storage location including a shelf or a bin with an indicia scanner, the indicia scanner having a transceiver within the indicia scanner;

recording details of the identity of the item scanned by the indicia scanner while scanning said indicium associated with said item;

receiving through the transceiver concurrently during said recording a GPS signal providing a first positional fix of said storage location;

determining the identity of the item as a result of the indicium being scanned by the indicia scanner;

receiving a broadcast error correction signal being transmitted directly from a base station having a fixed location through the transceiver of said indicia scanner;

comparing the broadcast error correction signal to the GPS signal to form a second positional fix of said storage location, the second positional fix being relatively closer to the storage location than said first positional fix;

transmitting information associated with said second positional fix and identity of the item to a database; and associating said second positional fix information and identity of the item in the database.

17. The method of claim 16 wherein said indicium is a bar code and said indicia scanner is a bar code scanner.

* * * * *

UNITED STATES PATENT AND TRADEMARK OFFICE
CERTIFICATE OF CORRECTION

PATENT NO. : 7,358,857 B1  
APPLICATION NO. : 09/338744  
DATED : April 15, 2008  
INVENTOR(S) : Jay P. White Page 1 of 1

It is certified that error appears in the above-identified patent and that said Letters Patent is hereby corrected as shown below:

In Column 6, Line 50, after "placing" delete "a".
(ORIGINALLY FILED SPECIFICATION DATED JUNE 23, 1999, PAGE 12, LINE 23)

In Column 8, Line 3, delete "$\vec{P(1)}$ P(2)" and insert -- $P(1) \rightarrow P(2)$. --, therefor.
(ORIGINALLY FILED SPECIFICATION DATED JUNE 23, 1999, PAGE 15, LINE 21)

In Column 9, Line 5, after "various" insert -- fixed --.
(ORIGINALLY FILED SPECIFICATION DATED JUNE 23, 1999, PAGE 17, LINE 20)

In Column 9, Line 8, delete "30" and insert -- 36 --, therefor.
(ORIGINALLY FILED SPECIFICATION DATED JUNE 23, 1999, PAGE 17, LINE 22)

Signed and Sealed this
Twenty-fifth Day of January, 2011

David J. Kappos
*Director of the United States Patent and Trademark Office*